Figure 4:
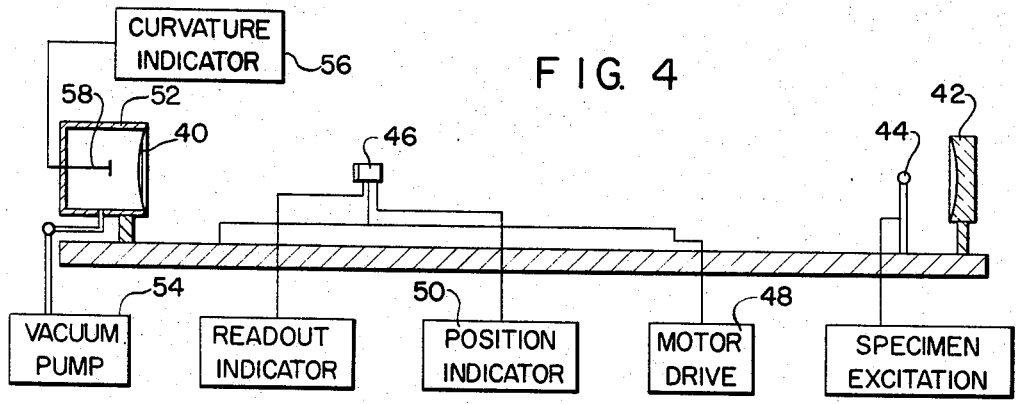

Sept. 26, 1967 W. S. BAIRD 3,343,448
SPECTROSCOPIC APPARATUS
Filed June 27, 1963 3 Sheets-Sheet 1
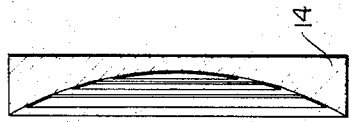
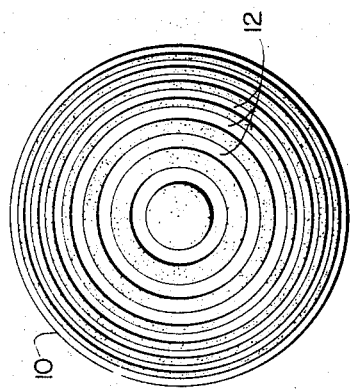
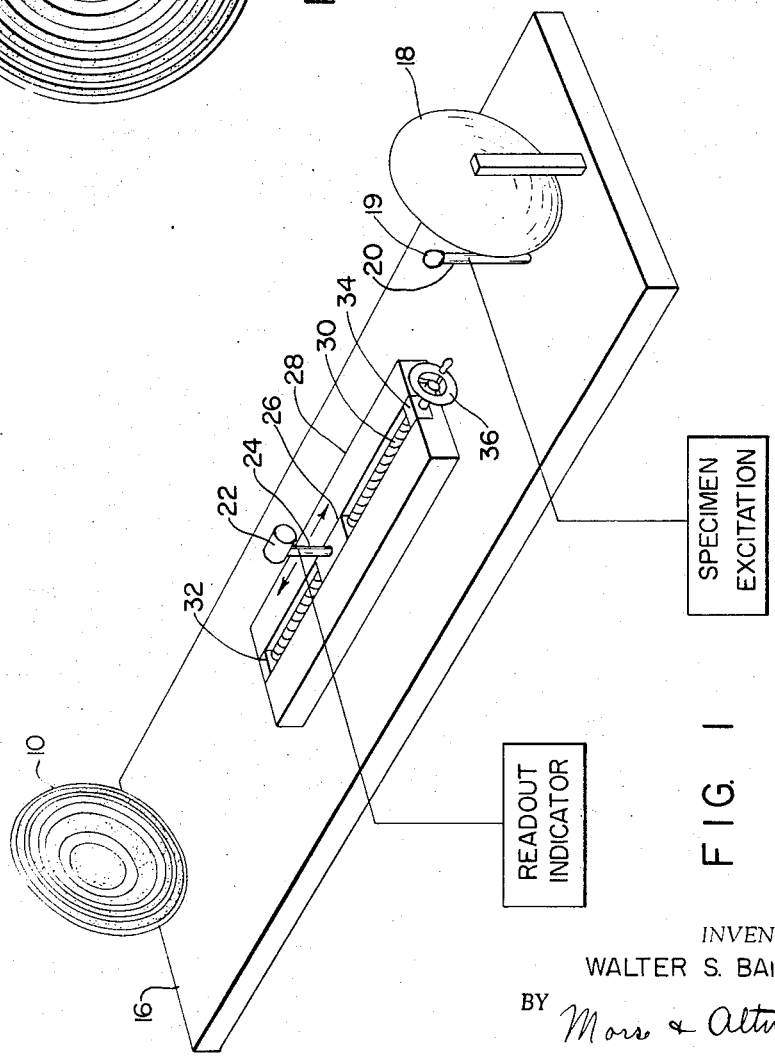
INVENTOR.
WALTER S. BAIRD
BY *Morse & Altman*
ATTORNEYS Sept. 26, 1967 W. S. BAIRD 3,343,448
SPECTROSCOPIC APPARATUS
Filed June 27, 1963 3 Sheets-Sheet 2

INVENTOR.
WALTER S. BAIRD
BY Morse & Altman
ATTORNEYS

Sept. 26, 1967  W. S. BAIRD  3,343,448
SPECTROSCOPIC APPARATUS
Filed June 27, 1963  3 Sheets-Sheet 3

OP = a
OB = b

INVENTOR.
WALTER S. BAIRD
BY Morse & Altman
ATTORNEYS

United States Patent Office 3,343,448
Patented Sept. 26, 1967

3,343,448
SPECTROSCOPIC APPARATUS
Walter S. Baird, Lexington, Mass., assignor to Baird-Atomic, Inc., Cambridge, Mass., a corporation of Massachusetts
Filed June 27, 1963, Ser. No. 290,966
1 Claim. (Cl. 88—14)

The present invention relates generally to spectrometers and more particularly is directed towards a spectrometer employing a reflecting zone plate as the dispersing element.

In a conventional spectroscopic instrument, radiation from the excited specimen is passed through a slit, collimated and focused against a dispersing element such as a grating, prism or the like. From the dispersing element the beam diverges into its spectrum. Because of this lateral dispersion, conventional spectroscopic instruments are quite large particularly if they are designed for a wide range of wave lengths.

In a spectrometer a number of photo-detecting devices are located at selected positions along the focal plane to monitor selected wave lengths. Although this arrangement has been found effective in spectroscopic work, a rather large housing is required to provide sufficient dispersion for proper analysis of the spectrum. Structural considerations become particularly bothersome when the spectrum extends into the far ultra-violet since the housing must be evacuated and maintained at a very low pressure in order to prevent absorption of that portion of the spectrum. A further disadvantage of a conventional spectrometer is the narrow line configuration of the monitored frequency incident on the detector. As a result of this condition, only a relatively small portion of the photo tube is able to be employed for detecting purposes.

Spectrometers in which the spectrum is laterally dispersed require a large number of photo detecting devices as well as exit slits, both of which must be manufactured with the utmost precision and must be carefully aligned with the optical axis of the system. Furthermore, various measures must be taken to keep the system in alignment since changes in ambient temperature may cause the beam to shift from a preset direction.

Accordingly, it is a general object of the present invention to provide improvements in spectroscopic instruments.

Another object of this invention is to provide a spectrometer which requires no entrance or exit slits and which utilizes substantially all of the sensing area of the photo detector.

Yet another object of this invention is to provide a simple, low cost, compact spectrometer which may be employed to monitor a wide range of spectral frequencies.

More particularly this invention features a spectrometer in which a concave reflecting zone plate is employed to axially disperse a beam incident on the plate's surface. A reflecting zone plate of this invention is analogous to a diffraction grating in which dispersion is present along its axis.

In the practice of this invention, a photo detecting device is located along the optical axis of the reflecting zone plate and the two components are axially movable relative to one another in order to focus selected portions of the axial spectrum onto the detecting device.

As another feature of this invention, a reflecting zone plate of variable curvature is employed to focus selected portions of the spectrum along the axis at which point the photo detecting device may be located.

Figure 5:
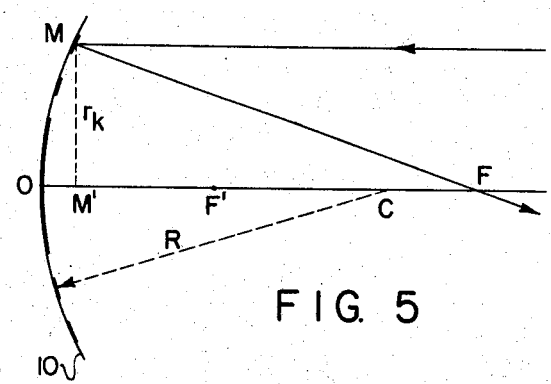
Figure 7:
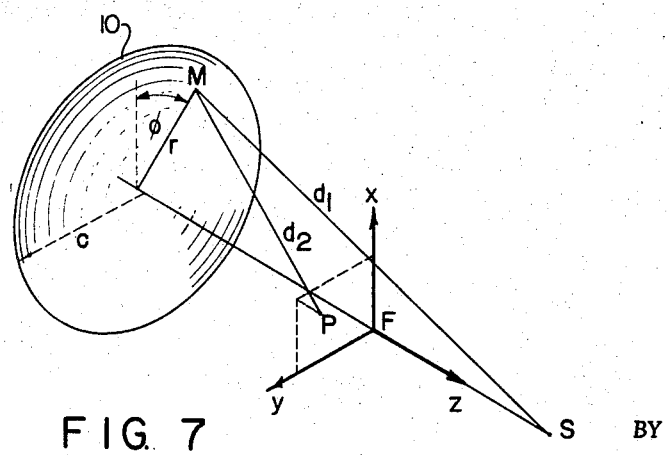
Figure 8:
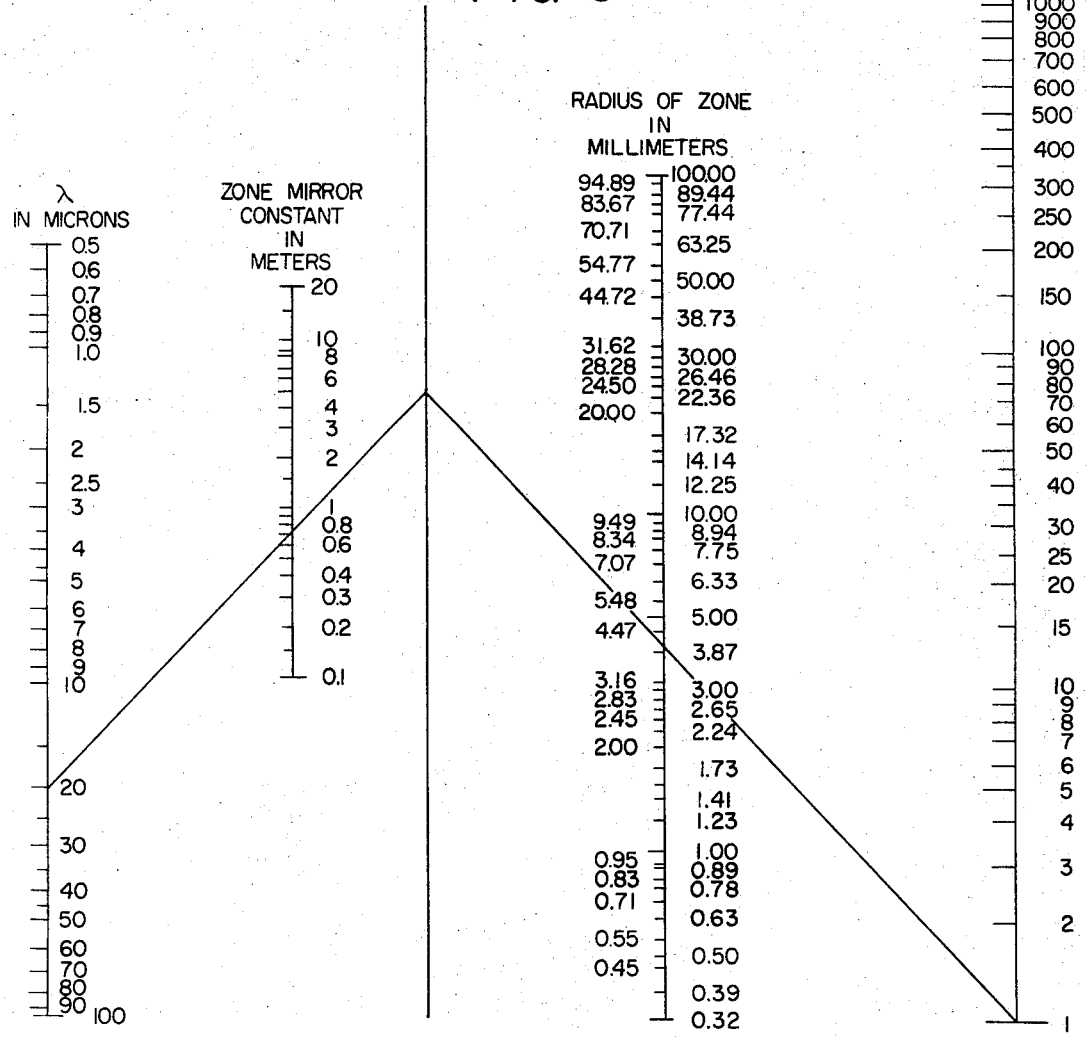
Figure 6:
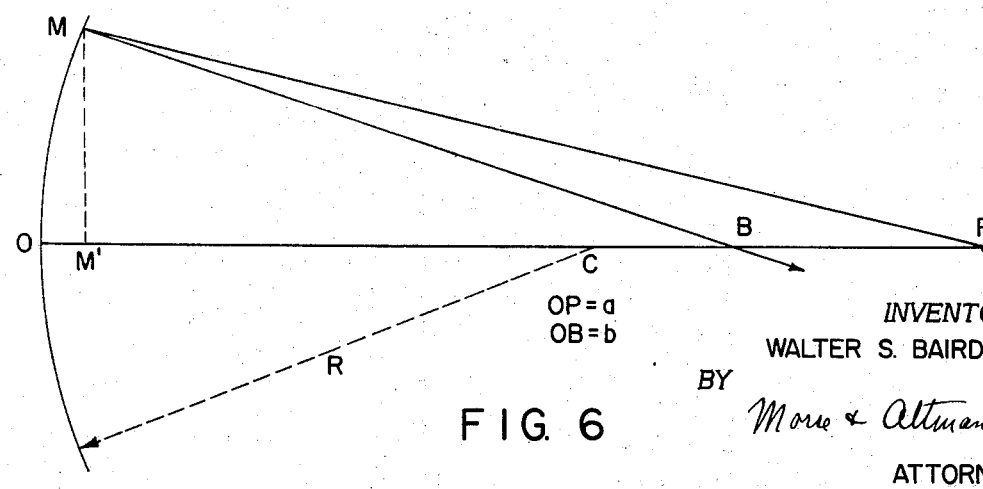

But these and other features of the invention, along with further objects and advantages thereof, will become more fully apparent from the following detailed description of the invention, with reference being made to the accompanying drawings in which:

FIGURE 1 is a view in perspective, somewhat schematic, of a spectrometer made according to the invention, FIGURE 2 is a view in front elevation of the reflecting zone plate made according to the invention, FIGURE 3 is a sectional view in side elevation of the zone plate shown in FIGURE 2, FIGURE 4 is a view in side elevation, partly in section and somewhat schematic showing a modification of the invention, FIGURE 5 is a diagram illustrating the geometry of the reflecting zone plate for rays parallel to the axis of the plate, FIGURE 6 is similar to FIGURE 5 but showing the optical geometry when the incident light has its origin at the optical axis, FIGURE 7 is a geometrical diagram for use in determining the amplitude of selected portions of the reflected beam, and FIGURE 8 is a nomogram for use in determining the size of zones.

In general, a zone plate is a screen designed to block off the light from every other half-period zone and is an application of Fresnel diffraction. The conventional zone plate comprises a flat matrix having a series of concentric annular zones, which are alternately transparent and opaque. Fresnel half-period zones are drawn with radii proportional to the square roots of whole numbers, and alternate ones are blackened. When a light beam from a point source is passed through the zone plate, an intense point image is produced much like that formed by a lens. The zone plate has the effect of removing alternate half turns of the spiral vibration curve for Fresnel diffraction with the resultants of the others all adding in the same phase.

In the present invention and as illustrated in FIGURES 2 and 3 of the drawings, a zone mirror 10 is employed to reduce an incident beam of light into an axially dispersed spectrum. The mirror 10 comprises a series of concentric reflecting zones 12 of negligible thickness, attached to the concave side of a spherical cap 14 of radius of curvature R.

Referring now more particularly to FIGURE 1 of the drawings, the zone mirror 10 is shown mounted upright to one end of a base 16 and facing in opposite alignment to a conventional concave mirror 18. The specimen or source 19 which is to be spectroscopically examined is located on a support 20 along the optical axis of the instrument and at the focal point of reflection of the concave mirror 18. Conventional means are provided to excite the specimen to radiative emission.

The function of the mirror 18 is to direct as much of the radiated energy as possible from the source towards the zone mirror 10. It will be appreciated that, if the source were located along the optical axis with no reflector, a very small percentage of the available energy would reach the zone plate 10 with the result that the sensitivity of the instrument would be considerably reduced.

Located between the zone mirror 10 and the concave mirror 18 is a detecting device such as a photomultiplying tube 22, which is optically aligned with the instrument and directed towards the zone mirror. In the illustrated embodiment the detecting device 22 is adapted to be moved along the optical axis in order to monitor selected portions of the spectrum. As shown, the device 22 is mounted on an upright post 24 which in turn is mounted to a follower 26. The follower is splined to a grooved plate 28 oriented parallel to the optical axis and a lead screw 30, rotatably supported at its ends by bearings 32 and 34, threadably engages the follower 26. A crank handle 36 is provided for rotating the lead screw and thereby moving the follower-detecting unit to any selected position along the optical axis.

Conventional measuring means are provided for indicating the response of the photo-detecting device at different positions and for different sources of energy. Also, the base plate 28 may be provided with bench markings 38 to indicate the location of different wave lengths along the optical axis.

In FIGURE 4 there is shown a modification of the invention, and in this embodiment a zone mirror 40 of variable curvature is employed to disperse axially an incident beam. As before, a concave mirror 42 is employed to direct radiant energy from a source 44 towards the zone mirror 40. A photo tube 46 is mounted along the axis of the instrument between the two mirrors and is provided with the usual indicating system. In this embodiment a reversible motor 48 is employed to rotate a lead screw and thereby advance the photo tube to a selected position along the optical axis. An automatic position indicator 50 of any suitable type may be employed to display the position of the photo tube with respect to the zone mirror 40.

In the modification of FIGURE 4, the zone mirror is formed on a flexible diaphragm mounted across the open end of a cylindrical drum 52. A vacuum pump 54 communicates with the interior of the drum 52 and functions to produce selected pressures below atmospheric pressure whereby various concave curvatures may be given to the diaphragm. A curvature indicator 56 including a probe 58 is also employed to monitor the condition of the diaphragm. The arrangement is a modification of the Kopito mirror which is more fully illustrated and described in U.S. Patent 3,031,928. By increasing the curvature of zone mirror, the axial separations of the spectral lines will be increased; however, this will be accompanied by a loss of energy at the axis.

In general, the basic properties of the zone mirror may be derived from purely geometrical considerations. For example, in FIGURE 5, rays parallel to the mirror axis are incident on the mirror surface and are diffracted by the ring array. The separation of the rings may be selected to make each contribution to the total amplitude arrive at some axial point, F, after traveling over paths that are successively longer by one full wave length. The condition to be satisfied by the radii of successive rings is:

$$MF - (OM' + OF) = \tfrac{1}{2} K \lambda_0 \quad (1)$$

where $K$ is an integer. Letting $OF = f_0$, $MM' = r_k$ and $u = r_k^2/(2f_0 - \tfrac{1}{2} k \lambda_0)$ Equation 1 leads to the quadratic equation:

$$u^2 - 4u(R - 2f_0 + \tfrac{1}{4} k \lambda_0) + \tfrac{1}{4} k^2 \lambda^2 R k \lambda_0 = 0 \quad (2)$$

Solving for $u$ and neglecting all terms of order $\lambda^2_0$, we may write:

$$r_k^2 = \frac{k f_0 \lambda_0}{2(f_0/R) - 1} \quad (3)$$

The left hand side of Equation 3 is an intrinsically positive quantity. Thus we are required to select $K < 0$ for $f_0 < \tfrac{1}{2} R$ and $k > 0$ for $f_0 > \tfrac{1}{2} R$. The physical significance of these choices is clear. The condition $f_0 = \tfrac{1}{2} R$ corresponds in geometrical optics to the focus of a spherical mirror. In the absence of spherical abberation, all paths to this point are equal. In contrast, paths to points at distances other than $\tfrac{1}{2} R$ are increasing longer or shorter depending on which side of the geometrical focus is selected and how far from the axis the incoming ray touches the spherical surface. Zone mirrors having reflecting areas separated by distances corresponding to positive values of $K$ are of primary interest, and, with this restriction, numerical values for the size of the zones, as given by Equation 3, may be read from the nomogram of FIGURE 8. If, for example, the radius of curvature is 1 meter and it is desired to focus a collimated beam of wavelength 20 microns at a distance of $f_0 = 1.5$ meters, the zone mirror constant is 0.75. The first step is to find the point in which the straight line through the points 20 microns and 0.75 in the wave length and mirror constant scales intersects the unlabeled auxiliary scale. Next, straight lines are drawn from this point to points on the order number scale located on the far right. The radii of the zones are found at the intersections of these lines and the zone radius scale. For $k = 1$ and 2 they are 3.91 and 5.56 millimeters respectively.

It can be readily verified that to within first order terms in $\lambda_0 R$, the areas of all zones are equal.

Zone mirrors are inherently chromatic. If a mirror is made with rings separations varying according to Equation 3, constructive interference takes place at F for radiation of wavelength $\lambda_0$. When the path difference between consecutive rays is one wavelength, the distance $f_0$ is called a first order focal length. Since the ratio $r_k^2/k$ is constant it follows that for any other wavelength $\lambda$, constructive interference takes place at a distance $f$ such that:

$$f_0/f = 2(f_0/R) - (\lambda/\lambda_0)(2f_0/R - 1) \quad (4)$$

Equation 4 for the ratio $f_0/f$ as a function of $\lambda/\lambda_0$ represents a hyperbola with the $\lambda/\lambda_0$ axis and the line $\lambda/\lambda_0 = (1 - R/(2f_0))^{-1}$ as asymptotes. Negative values of $f/f_0$ do not correspond to the points on the axis where constructive interference can occur. Hence, a first order focal point can be obtained only for wavelengths shorter than some maximum value. On the other hand, for some wavelengths, it is possible to find secondary foci where the intensity is reduced at a wavelength $\tfrac{1}{3}\lambda_0$, for example, each reflecting ring can encompass three Fresnel zones. The contributions from two of them cancel because of a half path difference. But the third one remains and the total effect is constructive interference in which successive rays exhibit a path difference of three full waves. This makes that point on the axis a third order focus for light of wavelength $\tfrac{1}{3}\lambda_0$.

In general, for an idealized zone mirror, foci corresponding to interference effects of odd order are shown to exist, while even order effects are absent. It can be easily verified that if $$\lambda_m/\lambda_0 = (1 - R(2f_0))^{-1} < 3 \quad (5)$$

wavelengths between $\lambda_0$ and $\lambda_m$ can appear in third or higher order at a focus between $f_0$ and a finite distance farther away from it.

When the source is located on the axis, but at a finite distance from the zone mirror, the situation is changed to some degree. FIGURE 6 shows the essential details of the new geometry. The analog of Equation 1, recognizing for the $n$-th zone $k = 2n$, is $$PO + OB + n\lambda_0 = PM + MB \quad (6)$$

Letting $PO = a$, $OB + b$, $OM' + \epsilon_n$ and using Equation 3 for $r_n$, we may write $$\frac{1}{f_0} = \frac{1}{a} + \frac{1}{b} - \frac{\epsilon n}{2R}\left[\frac{1}{a}\left(1 - \frac{R}{a}\right)^2 + \frac{1}{b}\left(1 - \frac{R}{b}\right)^2\right] \quad (7)$$

which, neglecting terms of order $\lambda_0/R$ and higher, is approximately equal to $$1/f_0 = 1/a + 1/b \quad (8)$$

To determine the limitations in the applicability of this equation, we may make use of the Rayleigh criterion according to which an image is sensibly degraded when the error in the optical path exceeds $\tfrac{1}{4}\lambda$. If to the left hand side of the Equation 6 we add $\pm \tfrac{1}{4}\lambda_0$ and simplify the resultant expression by means of Equation 8, we find that there is a maximum number of zones given by the inequality $$2(\lambda_0/R)n^2 < |(2f_0/R - 1)(M - 1)| \quad (9)$$

where $$(2f_0/R - 1)M = (f_0/a)(1 - R/a)^2$$
$$+ (f_0/b)(1 - R/b)^2 \quad (10)$$

This expression gives the allowable number of reflecting zones for good focus when the source lies on the axis. Notice that it restricts the number of zones even when the source is moved to infinity. If, for example, $f_0 = R = 1$ meter and $\lambda_0 = 1$ micron, the maximum number of zones is about 500.

To find the intensity distribution of the light in the neighborhood of a first order focus, reference is made to FIGURE 7 of the drawings where it is assumed that a monochromatic point source is located at point S. To find the amplitude of the disturbance that reaches the point P, we employ coordinates X, Y and Z with respect to a system with an origin at F and the Z axis pointing away from the zone mirror and directed along its axis. The position of the point M on the mirror is specified by the coordinates $r$ and $\phi$. Letting $SO=d$, $SM=d_1$, $MP=d_2$ and $$FM' = -(f_0 - \epsilon)$$

where $\epsilon = R - R[1-(r/R)^2]^{1/2}$, elementary geometrical considerations lead to relations $$d_1^2 = d^2 + 2R(R-d)[1-\sqrt{1-(r/R)^2}] \quad (11)$$

and $$d_2^2 = f_0^2 \begin{Bmatrix} 1+(r/f_0)^2+(x^2+y^2+z^2)/f_0^2 - 2(\epsilon/f_0) + \\ 2(z/f_0)(1-\epsilon/f_0) + (\epsilon/f_0)^2 - 2(r/f_0)[(x/f_0)\cos\phi + \\ (Y/f_0)\sin\phi] \end{Bmatrix} \quad (12)$$

The amplitude of the disturbance that reaches the point P after reflection is given by the classical Huygens-Fresnel formula $$U(P) = -(i/\lambda)\iint (A/d_1d_2) \exp(ikd_1) \exp(idk_2) dS \quad (13)$$

where K is the propagation constant and A is in general a complex amplitude which includes possible phase shifts introduced by the reflection at M. The inclination factors have been assumed to be unity. The element of area is $dS = (rdrd\phi)/[1-(r/R)^2]^{1/2}$ and the integration is extended over the entire area of the mirror.

In order to find the amplitude of the contribution from one ring, we assume that the mirror has a small aperture i.e., $c/R \ll 1$. Without serious error, it then is possible to replace the factor $[1-(c/R)^2]^{1/2}$ by unity and, in the exponential, retain only the first two terms of the expansion of the square root in ascending powers of $(c/R)^2$. When this is done the contribution from the $n$-th ring becomes $$U_n(P) = 4\pi R^2 A \exp[-2\pi i(n-1)(f_0/R)\zeta K\chi(2n-2) +\chi(2n-1)\exp[-i\pi(f_0/R)\zeta] \quad (15)$$

where $$\zeta = (Z/f_0)/[Z(f_0/R)-1] \quad (16)$$

and $$\chi(n) = J_1(2\pi\rho\sqrt{n})/2\pi\rho\sqrt{n} \quad (17)$$

The amplitude of the disturbance reaching the point P for an array of N reflecting zones is, therefore, $$U_N = 4\pi R^2 A \sum_1^N \exp[-2\pi i(n-1)(f_0/R)\zeta]\chi(2N-2)$$

$$= \chi(2N-1)\exp[-1\pi(f_0/R)\zeta] \quad (18)$$

The summation may be carried out explicity for $\rho = 0$, that is, along the axis. By virtue of the relation we have $$\lim_{\rho \to 0} \chi(n) = \frac{1}{2}$$

$$U(\text{axis}) = 2\pi R^2 A \exp[-i\pi(N-\frac{1}{2})(f_0/R)\zeta]\{\sin[N\pi(f_0/R)\zeta]/\sin[\frac{1}{2}\pi(f_0/R)\zeta]\} \quad (19)$$

From Equation 19, it follows that the intensity along the axis is given by the expression $$I/I_0 = [\sin Nx/\sin \frac{1}{2}x]^2 \quad (20)$$

where $$x = \pi(z/R)/[2(f_0/R)-1] \quad (21)$$

and $$I_0 = (2\pi R^2 A)^2 \quad (22)$$

It is clear from Equation 20 that a zone mirror may be regarded as analogous to a grating in which dispersion is present along its axis. The resulting power may be calculated without difficulty. From Equations 4 and 20, it follows that $$\Delta\lambda/\lambda = (\Delta Z/f_0)/[2(f_0/R)-1] = R/(f_0 N) \quad (23)$$

Reasonable values assigned to $R$ and $f_0$ make the ratio $R/f_0$ of order unity. Consequently, the resulting power is determined exclusively by the number of zones in the mirror.

Zone plates are inherently chromatic and to find how the focal length changes with wavelength, we may refer to basic expression for the radius of a zone namely $$r_k^2 = -\frac{kf\lambda}{1-2(f/R)} \quad (24)$$

Presume a concave zone plate has been made to have a focal length $f_0$ for a wavelength $\lambda_0$. For such a plate the ratio $r_k^2/k$ is constant and equal to $$-\frac{f_0\lambda_0}{1-2(f_0/R)} \quad (25)$$

we can therefore write $$\frac{f\lambda}{1-2(f/R)} = \frac{f_0\lambda_0}{1-2(f_0/R)} \quad (26)$$

which may be put in form $$f = \frac{f_0}{\left(\frac{2f_0}{R}\right) - \left(\frac{\lambda}{\lambda_0}\right)\left(\frac{2f_0}{R}-1\right)} \quad (27)$$

Differentiating this equation, we find that the axial dispersion of the zone plate is proportional to the square root of the focal length. That is $$\frac{df}{d\lambda} = \frac{f^2}{\lambda_0 f_0}\left(\frac{2f_0}{R}-1\right) \quad (28)$$

The axial distribution of energy is a function of distance from the principle focus shows variations described by the general function $$\left[\frac{\sin N_x}{\sin \frac{1}{2}x}\right]^2 \quad (29)$$

Consequently, along the axis the zone plate behaves in a way that makes it the analog of a diffraction grating.

Since different wave lengths reflected from the surface of the zone mirror will focus at different points along the optical axis, an axial spectrum is provided. Selected frequencies may be monitored by locating a photo-detecting tube at a selected position along the optical axis. The several energy peaks along the optical axis may be focused onto the detecting device by moving the detecting device axially as suggested in the principal embodiment of FIGURE 1 or by moving the zone mirror to or away from the detecting device. A third arrangement is to employ the avariable curvature mirror suggested in FIGURE 4.

While the invention has been described with particular reference to the illustrated embodiments, it will be understood that numerous modifications thereto will appear to those skilled in the art. For example, dielectric strata may be applied to alternate rings in order to change the phase of the contributions from the rings. Also, all of the rings may be reflecting with alternate rings being displaced from the curved plane of a neighboring ring by a distance of one-half a wavelength. This will also function to change the phase of contributions from the rings. Other modifications will also appear to those skilled in the art.

Accordingly, it will be understood that the above description and accompanying drawings should be taken as illustrative of the invention and not in a limiting sense.

Having thus described my invention what I claim and desire to obtain by Letters Patent of the United States is:

A spectrometer for axially dispersing a beam of light from a radiating source, comprising a zone mirror generally facing said source, a photo-detecting device located along the axis of said mirror between said source and said mirror and facing said mirror, said mirror comprising a flexible diaphragm, a series of concentric rings alternately reflecting and non-reflecting on said flexible diaphragm, an open-ended cylindrical drum, said diaphragm being mounted across the open end of said drum and means connecting said drum for evacuating the interior thereof to vary the curvature of said mirror.

References Cited

UNITED STATES PATENTS 3,189,907   6/1965   Van Buskirk _____ 88—1

OTHER REFERENCES

Ellis et al.: "Zone Plate Determination of Dominant Wave-Length of Filtered Lamp Light" J.O.S.A., vol. 24, April 1934, pp. 103–106.

Walsh: "Echellette Zone Plates For Use In Far Infrared Spectroscopy" J.O.S.A., vol. 42, No. 3, March 1952, p. 213.

Buskirk et al.: "The Zone Plate as a Radio-Frequency Focusing Element" IRE Transactions on Antennas and Propagation, vol. AP–9, May 1961, pp. 319–320.

JEWELL H. PEDERSEN, *Primary Examiner.*

R. L. WIBERT, *Examiner.*